US006639066B2

(12) United States Patent
Boström et al.

(10) Patent No.: US 6,639,066 B2
(45) Date of Patent: Oct. 28, 2003

(54) AQUEOUS SUSPENSION OF A CELLULOSE ETHER, METHOD FOR THE PRODUCTION THEREOF, AND A DRY BLEND

(75) Inventors: Peter Boström, Ytterby (SE); Gunvor Karlsson, Stenungsund (SE)

(73) Assignee: Akzo Nobel N.V., Arnhem (NL)

( * ) Notice: Subject to any disclaimer, the term of this patent is extended or adjusted under 35 U.S.C. 154(b) by 8 days.

(21) Appl. No.: 10/015,466

(22) Filed: Dec. 12, 2001

(65) Prior Publication Data

US 2002/0121224 A1 Sep. 5, 2002

(30) Foreign Application Priority Data

Dec. 15, 2000 (SE) ............................... 0004649

(51) Int. Cl.⁷ ..................... C08B 11/00; C08B 11/02; C08B 11/08
(52) U.S. Cl. ..................... 536/84; 536/56; 536/95; 536/96; 106/204.01
(58) Field of Search ............... 514/57; 536/84, 536/56, 91, 95, 96

(56) References Cited

U.S. PATENT DOCUMENTS

| 4,228,277 A | 10/1980 | Landoll ................ 536/90 |
| 4,692,275 A | 9/1987 | Secemski et al. .......... 252/534 |
| 4,883,536 A | * 11/1989 | Burdick |
| 5,140,099 A | 8/1992 | Bostrom et al. ............ 536/91 |
| 5,837,864 A | 11/1998 | Andersson et al. ......... 536/124 |
| 5,898,072 A | * 4/1999 | Boström |

FOREIGN PATENT DOCUMENTS

| DE | 2 060 106 | 3/1972 | ............. C04B/1/08 |
| EP | 0 003 582 A3 | 8/1979 | ............. C08L/1/26 |
| EP | 0 003 582 A2 | 8/1979 | ............. C08L/1/26 |
| EP | 0 357 962 A2 | 3/1990 | ............. C08J/3/03 |
| EP | 0 413 274 A2 | 2/1991 | ............. C08L/1/28 |
| EP | 0 482 533 A2 | 4/1992 | ............. C08J/3/03 |
| WO | WO 95/30705 | 11/1995 | ............. C08J/3/03 |

* cited by examiner

*Primary Examiner*—Samuel Barts
*Assistant Examiner*—Michael C Henry
(74) *Attorney, Agent, or Firm*—Ralph J. Mancini; Michelle J. Burke

(57) ABSTRACT

This invention relates to a suspension of a water-soluble, nonionic cellulose ether having a fairly low content of an electrolytic salt exhibiting a high stability and a low viscosity. The suspension having a pH-value of below 8.0, contains 10–30% by weight of a water-soluble, nonionic cellulose ether, and 10–22% by weight of an electrolytic salt, wherein the electrolytic salt contains a) 10–90% by weight of a salt of polyphosphate having 3–12 phosphate groups, and
b) 10–90% by weight of a salt selected from the group consisting of ortophosphate, pyrophosphate, sulphate, carbonate and a mixture thereof. The suspension is advantageously produced by adding a dry blend containing the water-soluble cellulose ether in cross-linked form and the electrolytic salt to water.

14 Claims, No Drawings

AQUEOUS SUSPENSION OF A CELLULOSE ETHER, METHOD FOR THE PRODUCTION THEREOF, AND A DRY BLEND

The present application claims priority of Swedish patent application No. 0004649-0 filed on Dec. 15, 2000.

1. Field of the Invention

The present invention relates to a suspension of a water-soluble, nonionic cellulose ether having a fairly low content of an electrolytic salt exhibiting a high stability and a low viscosity. The suspension is advantageously produced by adding a dry blend containing the water-soluble cellulose ether in cross-linked form and the electrolytic salt to water.

2. Background of the Invention

Water-soluble, nonionic cellulose ethers are used in many industrial processes, as well as in many consumer products. For example, such ethers are used in mining, papermaking, water purification and textile treatment, as well as in paint compositions, cleaning agents and cosmetics. It is, however, difficult to dissolve pulverulent, water-soluble, nonionic cellulose ethers, owing to their tendency to gel and agglomerate. One way of solving this problem is to suspend the water-soluble cellulose ethers in water containing a considerable amount of electrolyte and, optionally, a dispersing agent and/or a stabiliser. When adding water to the suspension, the electrolyte content is reduced and the cellulose ethers are dissolved without any gelling or lump formation. The cellulose ethers thus suspended in water have proved well suited for use as intermediate product in industrial processes and in the making of consumer products.

European Patent Application 413 274 discloses an aqueous suspension of hydroxyethylcellulose. This suspension contains 8–28% by weight of water-soluble hydroxyethylcellulose; 20–35 by weight of potassium carbonate, based on the weight of potassium carbonate and water; 0.2–8% by weight of a wetting agent having an HLB value of 6–9; and 0.08–0.6% by weight of a water-soluble or water-swellable thickening agent, both contents being based on the total weight of the suspension. Also, European Patent Application 482 533 teaches the suspension of a nonionic cellulose ether, such as hydrophobe-modified hydroxyethylcellulose, hydrophobe-modified ethyl hydroxyethylcellulose, methylcellulose and hydroxyethylcellu-lose, in an aqueous solution of sodium formate. It appears from the Examples that a gel, and not a liquid suspension, is obtained when the content of sodium formate is 20% by weight or 25% by weight of the total composition. According to this European patent application, sodium formate has to be present in an amount of at least 30% by weight if a suspension is to be obtained. However, even though stable and useful suspensions can be produced in accordance with these two European patent applications, these suspensions will contain unacceptably high contents of electrolyte.

European Patent Application 3 582 teaches a method for reducing the electrolyte content of suspensions of water-soluble, nonionic cellulose ethers. According to the patent application, this is achieved by adding not only an electrolytic salt but also an aluminium oxide compound. Owing to the addition of aluminium oxide, the electrolyte content may, according to the patent application, be reduced from about 25% to 10%. The presence of aluminium oxide, either in solid or in colloidal state, may, however, have adverse effects later on when the suspension is to be used.

WO 95/30705 discloses an aqueous suspension containing a nonionic cellulose ether cross-linked with glyoxal and an electrolytic salt giving the aqueous phase a pH-value below 8, and a dry blend containing said cellulose ether and said electrolytic salt.

The main object of the present invention is to provide a suspension of a cellulose ether having a fairly low electrolyte content in combination with an improved stability and a low viscosity. According to the invention it is also desirable to enable a production of suspensions having a low as well as a high content of cellulose ether, and to enable a simple and expedient production of suspensions at the places where they are to be used, and thereby avoiding unnecessary transports of water.

The present invention meets all of the aforementioned objectives by providing for a suspension of a water-soluble, nonionic cellulose ether having low electrolytic salt content which exhibits high stability and a low viscosity.

SUMMARY OF THE INVENTION

The claimed invention relates to a suspension of a water-soluble, nonionic cellulose ether having low electrolytic salt content which exhibits high stability and a low viscosity. The suspension having a pH-value of below 8.0, contains 10–30% by weight of a water-soluble, nonionic cellulose ether, and 10–22% by weight of an electrolytic salt, wherein the electrolytic salt contains a) 10–90% by weight of a salt of polyphosphate having 3–12 phosphate groups, and b) 10–90% by weight of a salt selected from the group consisting of ortophosphate, pyrophosphate, sulphate, carbonate and a mixture thereof.

DETAILED DESCRIPTION OF THE INVENTION

The present invention relates to a suspension of a water-soluble, nonionic cellulose ether having low electrolytic salt content which exhibits high stability and a low viscosity. The suspension having a pH-value of below 8.0, contains 10–30% by weight of a water-soluble, nonionic cellulose ether, and 10–22% by weight of an electrolytic salt, wherein the electrolytic salt contains a) 10–90% by weight of a salt of polyphosphate having 3–12 phosphate groups, and b) 10–90% by weight of a salt selected from the group consisting of ortophosphate, pyrophosphate, sulphate, carbonate and a mixture thereof. The suspension is advantageously produced by adding a dry blend containing the water-soluble cellulose ether in cross-linked form and the electrolytic salt to water.

The water content of the suspension is normally from 42 to 88%, preferably from 50 to 80%, by weight. The cationic ions of the polyelectrolytic salt comprise at least 50%, preferably at least 90%, by weight of sodium, potassium and/or ammonium ions. Suitably cationic ions of the polyelectrolytic salt contain a mixture of sodium and potassium ions on one hand and ammonium ions on the other in a molar ratio of from 1:4 to 4:1. It has also unexpectedly been found that the polyelectrolytic salts do not only stabilise the suspension but may also stabilise the formulation in which the suspension is used such as paint compositions, gypsum and concrete formulations, paper coating compositions, calcium carbonate formulations and colorants. The need to add stabilisers to such formulations can be reduced or totally avoided.

The polyphosphate is suitably present in an amount from 2 to 15%, preferably 3–12%, by weight. Examples of suitable polyphosphates are a sodium or potassium tripolyphosphate or hexametaphosphate or mixtures thereof. Preferably the polyphosphate is a sodium tripolyphosphate or sodium hexa-metaphosphate, since they are easily available and exhibit suitable stabilising and electrolytical properties.

The salt component b) contains preferably at least 50% by weight of diammonium ortophosphate, ammoniumdiphosphates, disodium ortophosphate, sodium pyrophosphates, dipotassium-ortophosphate, potassium pyrophosphates, diammonium sulphate, diammonium carbonate, dipotassium sulphate, sodium hydrogen ortophosphate, sodium hydrogen carbonate, magnesium sulphate or dipotassium carbonate or a mixture thereof. The salt components a) and b) may both independently of each other be present in an amount of 2–15%, preferably 3–12%, by weight, of the salt. In addition to the salt components a) and b) the polyelectrolyte may contain other salt, e.g. sodium formate, sodium citrate, NaCl and NaNO$_3$. Sodium formate is especially preferred owing to its high solubility, as are alkali salts with bivalent anions, such as Na$_2$SO$_4$ and K$_2$SO$_4$. For example the electrolyte salt can contain sodium formate and sodium citrate, one or more acid salts, such as a NaH$_2$PO$_4$, in such an amount that the suspension preferably obtains a pH-value of 6–7.5. By selecting an electrolyte salt, which to a large extent is made up of salts with bivalent anions, one is able to reduce the salt content of the suspension.

The nonionic cellulose ethers employed are normally conventional cellulose ethers. The cellulose ethers may have a turbidity point (flocculation temperature) from 25° C. to 100° C. measured in a 1% by weight aqueous solution but cellulose ethers having a turbidity point of above 100° C. may also be used. Preferably the cellulose ethers have a turbidity point of 30° C. to 80° C. The viscosity is normally between 5 and 10000 mPa·s, preferably between 10 and 7000 mPa·s measured with a Brookfield viscosimeter, type LV, at 12 rpm at 20° C. Suitable examples are water-soluble alkylcellulose ethers, such as methyl cellulose and ethyl cellulose; hydroxyalkyl cellulose ethers, such as hydroxyethyl cellulose, hydroxypropyl cellulose, hydroxypropyl hydroxybutyl cellulose, hydroxyethyl hydroxypropyl cellulose, hydroxyethyl hydroxybutyl cellulose and hydroxyethyl hydroxypropyl hydroxybutyl cellulose; alkylhydroxyalkyl cellulose ethers, such as methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose; and water-soluble cellulose ethers modified with hydrophobic groups, which contains hydrocarbon groups, such as aliphatic groups and alkylaryl groups, in accordance with U.S. Pat. Nos. 4,228,277 and 5,140,099.

The nonionic cellulose ethers may be cross-linked with a cross-linking agent in a manner known. A cross-linked cellulose ether has a suitable degree of cross-linkage when a 1% by weight water slurry thereof at 20° C. and a pH-value of 7.0 results, after 5 min of agitation, in a viscosity increase of less than 5%, preferably less than 1%, of the viscosity obtained when the cross-linked cellulose ether is entirely dissolved. The viscosity is measured with a Brookfield viscosimeter, type LV, at 12 rpm at 20° C. Cellulose ethers having a suitable degree of cross-linkage can be obtained by reacting 0.05–2 parts by weight of glyoxal as cross-linking agent and 100 parts by weight of dry cellulose ether.

Apart from the cellulose ether and the electrolytic salt, the suspension may contain a stabiliser and a dispersing surfactant although it is normally not desirable or needed. The stabiliser may comprise a viscosity-increasing polymer such as xanthan gum and CMC that is soluble in the electrolytic solution and is present in an amount of 0.01–1%, based on the weight of the suspension, while the dispersing surfactant may be added in an amount of 0.05–2% by weight. Usually, the dispersing agent is an anionic surfactant, such as alkylphosphate, alkylsulphonate, alkylarylsulphonate, alkylsulphate, alkyl ether sulphate and alkylamide ether carboxylate, a cationic surfactant, such as quaternary fatty amine ethoxylates, or a nonionic surfactant, such as alcohol ethoxylate and alkylamide ethoxylate. The dispersing agent has a stabilising and viscosity-reducing effect.

When producing the inventive suspension, all the dry substances, except the nonionic cellulose ether, can be added to water including any liquid or paste-like additives. The cellulose ether is then added to the aqueous liquid obtained.

In a preferred method for producing the cellulose ether suspension according to the invention, the water in the suspension is mixed with a dry blend containing a cross-linked cellulose ether, the electrolytic salt, and preferably the other components of the suspension as well. In the event that one or more of the components are in liquid state, this component or these components are conveniently applied to a carrier and then incorporated in the dry blend. If so desired, one or more of the components, except the cellulose ether and the electrolytic salt, may also be added to the water after and/or before the admixture to the water of the dry blend containing the cellulose ether and the electrolytic salt. The use of a dry blend containing all of its components, except the water, is normally preferred, since the suspension can be prepared by adding the dry blend to the water in a single step.

Conveniently a dry blend according to the invention contains 45–75%, preferably 50–70%, by weight of the cellulose ether and 25–50%, preferably 30–45%, by weight of the electrolytic salt. In addition the dry composition may contain other ingredients from 0.1–10% by weight.

In addition to the components indicated above, the composition may contain biocides, foam inhibitors, corrosion inhibitors and so forth.

The invention will further be illustrated by the following examples.

EXAMPLE 1

Dry compositions were produced by dry blending of the nonionic cellulose ether and electrolytic salts in accordance with the Table I below. The compositions were then suspended in water and the suspensions formed were stored for one week whereupon the stability of the suspensions was observed and the viscosity of stable suspension measured according to ASTM D 560–81 (Stormer, KU). The results obtained are also set forth in Table 1.

TABLE I

Stability and viscosity of suspensions containing nonionic cellulose ethers

Formulations, parts by weight

| Ingredients | 1 | 2 | 3 | 4 | 5 | 6 | 7 | 8 | 9 | A | B | C | D |
|---|---|---|---|---|---|---|---|---|---|---|---|---|---|
| EHEC[1)] | 20 | | | | 20 | 20 | 20 | 20 | 20 | 20 | | | |
| HMEHEC[2)] | | 20 | | | | | | | | | 20 | | |
| HEC[3)] | | | 20 | | | | | | | | | 20 | |
| MEHEC[4)] | | | | 20 | | | | | | | | | 20 |
| STPP[5)] | 6 | 6 | 6 | 6 | 6 | 6 | 6 | 6 | 6 | | | | |
| $(NH_3)_2HPO_4$ | | | | | 7 | 3 | | | | 6 | 6 | 6 | 6 |
| $(NH_3)_2SO_4$ | 7 | 7 | 7 | 7 | | 4 | 4 | 4 | 4 | 7 | 7 | 7 | 7 |
| Na citrate | | | | | | | 3 | | | | | | |
| $K_2SO_4$ | | | | | | | | | 3 | | | | |
| $NaH_2PO_4$ | colspan: Added to a pH-value of 7.3 | | | | | | | | | | | | |
| Water | 67 | 67 | 67 | 67 | 67 | 67 | 67 | 67 | 67 | 67 | 67 | 67 | 67 |
| Stability | yes | yes | yes | yes | yes | yes | yes | yes | yes | no | no | no | no |
| Stormer, KU | 80 | 77 | 80 | 90 | 80 | 68 | 80 | 70 | 75 | — | — | — | — |

[1)]Cross-linked ethylhydroxyethylcellulose, turbidity point 70° C.
[2)]Cross-linked ethylhydroxyethylcellulose hydrophobically modified with a $C_{16}$—$C_{18}$-alkyl group, turbidity point 55° C.
[3)]Cross-linked hydroxyethylcellulose, turbidity point above 100° C.
[4)]Cross-linked methylethylhydroxyethylcellulose, turbidity point 65° C.
[5)]Sodium tripolyphosphate From the results obtained it is evident that the suspensions according to the invention (tests 1–9) have an improved stability over the suspensions in the comparison tests A–D. In the comparison test all the suspensions had separated and had a water layer on the top.

EXAMPLE 2

Two dry blends were prepared by mixing the hydrophobically modified cellulose ether (HMEHEC) described in Example 1 and electrolytic salts in accordance with Table II below. The two blends were then suspended in water, whereupon the stability of the suspensions was visually observed and the Stormer viscosity of the suspensions was measured. The results obtained are set forth in Table II.

TABLE II

Stability and viscosity of aqueous, cellulose ether-containing suspensions

| Ingredients, parts by weight | Tests | | |
|---|---|---|---|
| | 10 | 11 | E |
| HMEHEC | 20 | 25 | 20 |
| Diammoniumsulphate | 9 | 8.5 | 13 |
| Sodium hexametaphosphate | 4 | 8 | — |
| Water | 67 | 58.5 | 67 |
| Stability | Yes | Yes | No |
| Stormer, KU | 63 | 80 | — |

From the results it is evident that the suspensions 10 and 11 according to the invention exhibit a good stability and suitable viscosity.

EXAMPLE 3

Two flat paint compositions were produced by first preparing an aqueous solution by mixing water and an aqueous cellulose ether-containing suspension. Said aqueous suspension contained 20% by weight of the suspension in formulation 1 in Example 1.

In a third flat paint composition for comparison an aqueous solution of the cellulose ether was first prepared by mixing water and a 3.5% by weight of an aqueous solution of cellulose ether.

Thereupon pigments and auxiliary chemicals according to table III below were thoroughly mixed into the aqueous solutions followed by the addition of a defoamer and a latex. The mixtures were blended to homogeneity. The stability of the three flat paint compositions were then tested and the results obtained are shown in Table III below.

TABLE III

Paint compositions and their viscosity

| Components | Formulations, parts by weight | | |
|---|---|---|---|
| | 12 | 13 | E |
| Water | 167.8 | 167.8 | 124.5 |
| Aqueous solution of 3.5% EHEC (defined in Example 1) | — | — | 50 |
| Slurry in accordance with formulation 1 | 8.75 | 8.75 | — |
| Defoamer (Byk 033) | 0.5 | 0.5 | 0.5 |
| Aqueous solution of sodium polyacrylate (40%) | — | 1 | 2 |
| Nonylphenol ethoxylate (NF + 10EO) | 1.5 | 1.5 | 1.5 |
| Propylene glycol | 7.5 | 7.5 | 7.5 |
| Bactericide (Canguard) | 1 | 1 | 1 |
| Calcium carbonate | 93.5 | 93.5 | 93.5 |
| Titanium oxide (Kronos 2190) | 50 | 50 | 50 |
| Kaolin (Polstar 200) | 62 | 62 | 62 |
| Vinylacetate-ethylene copolymer (Mowilith LDM 1871) | 106 | 106 | 106 |
| Defoamer (Byk 033) | 1.5 | 1.5 | 1.5 |
| Total | 500 | 500 | 500 |
| Viscosity | Stormer, KU | | |
| After 1 day | 116 | 104 | 99 |
| After 4 weeks at 50° C. | 119 | 104 | 103 |

From the results it is evident that the formulations 12 and 13 have a good stability and that the addition of stabilising sodium polyacrylate in the comparison test can be reduced and even deleted by using an electrolytic salt according to the invention.

We claim:

1. An aqueous suspension having a pH-value of below 8.0, which comprises 10–30% by weight of a water-soluble, nonionic cellulose ether, and 10–22% by weight of an electrolytic salt, wherein the electrolytic salt comprises
   a) 10–90% by weight of a salt of polyphosphate having 3–12 phosphate groups, and
   b) 10–90% by weight of a salt selected from the group consisting of ortophosphate, pyrophosphate, sulphate, carbonate and a mixture thereof.

2. The aqueous suspension of claim 1, wherein components a) and b) both are present in an amount from 2 to 15% by weight of the suspension.

3. The aqueous suspension of claim 1 wherein the polyphosphate is a sodium tripolyphosphate or sodium hexametaphosphate.

4. The aqueous suspension of claim 1 wherein component b) contains at least 50% by weight of diammonium ortophosphate, ammonium diphosphates, disodium ortophosphate, sodium pyrophosphates, dipotassium ortophosphate, potassium pyrophosphates, diammonium sulphate, diammonium carbonate, dipotassium sulphate, sodium dihydrogen ortophosphate, sodium hydrogen carbonate, magnesium sulphate or dipotassium carbonate or a mixture thereof.

5. The aqueous suspension of claim 1 wherein the cationic ions of the polyelectrolytic salt contain a mixture of i) sodium and/or potassium ions and ii) ammonium ions, wherein the molar ratio of sodium and/or potassium ions to ammonium ions is from 1:4 to 4:1.

6. The aqueous suspension of claim 1 wherein the cellulose ether is cross-linked and has a viscosity increase, after agitation for 5 minutes in a 1% by weight water slurry at a temperature of 20° C. and a pH-value of 7, of less than 5% of the viscosity obtained when the cellulose ether is totally dissolved.

7. The aqueous suspension of claim 1 wherein the cellulose ether before any cross-linking has a turbidity point of 25–100° C. as measured in a 1% by weight water solution.

8. A method of producing a suspension of claim 1 which comprises adding a dry blend containing a cross-linked cellulose ether and the electrolytic salt to water in the suspension and mixing the suspension.

9. A dry blend which comprises 45–75% by weight of a non-ionic cellulose ether and 25–50% by weight of a polyelectrolytic salt which comprises
   a) 10–90% by weight of a salt of polyphosphate having 3–12 phosphate groups, and
   b) 10–90% by weight of a salt selected from the group consisting of ortophosphate, pyrophosphate, sulphate, carbonate and a mixture thereof.

10. The dry blend of claim 9 wherein the cellulose ether is cross-linked and has a viscosity increase, after agitation for 5 minutes in a 1% by weight water slurry at a temperature of 20° C. and a pH-value of 7, of less than 5% of the viscosity obtained when the cellulose ether is totally dissolved.

11. The dry blend of claim 9 wherein the cellulose ether before any cross-linking has a turbidity point of 25–100° C. as measured in a 1% by weight water solution.

12. The dry blend of claim 9 wherein the polyphosphate is a sodium tripolyphosphate or sodium hexametaphosphate.

13. The dry blend of claim 9 wherein component b) contains at least 50% by weight of diammonium ortophosphate, ammonium diphosphates, disodium ortophosphate, sodium pyrophosphates, dipotassium ortophosphate, potassium pyrophosphates, diammonium sulphate, diammonium carbonate, dipotassium sulphate, sodium dihydrogen ortophosphate, sodium hydrogen carbonate, magnesium sulphate or dipotassium carbonate or a mixture thereof.

14. The dry blend of claim 9 wherein the cationic ions of the polyelectrolytic salt contain a mixture of i) sodium and/or potassium ions and ii) ammonium ions, wherein the molar ratio of sodium and/or potassium ions to ammonium ions is from 1:4 to 4:1.

* * * * *